July 20, 1943.　　　W. B. JOHNSON　　　2,324,507
AMBULANCE STEP
Filed Oct. 16, 1941
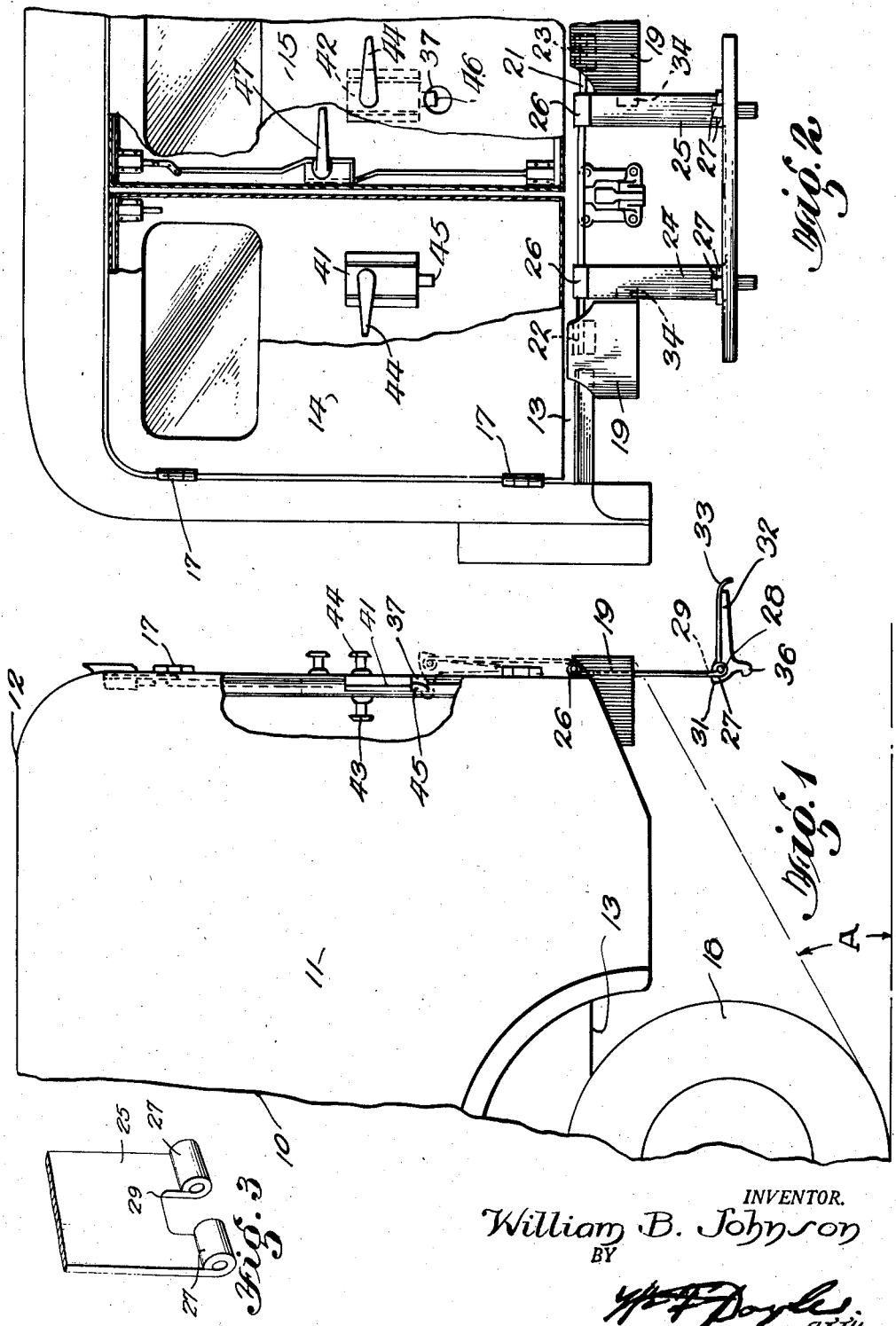
INVENTOR.
William B. Johnson Patented July 20, 1943

2,324,507

UNITED STATES PATENT OFFICE 2,324,507

AMBULANCE STEP

William B. Johnson, United States Army,
Baltimore, Md.

Application October 16, 1941, Serial No. 415,228

9 Claims. (Cl. 280—166)

(Granted under the act of March 3, 1883, as
amended April 30, 1928; 370 O. G. 757)

The invention described herein, if patented may be manufactured and used by or for the Government for governmental purposes without the payment of any royalty thereon.

The present invention relates to motor vehicles and more specifically to a novel and improved form of vehicle step particularly applicable to use on military ambulances.

Before considering the details of the invention herein disclosed, attention should be called to the fact that a military ambulance is often called upon to travel at high speeds over extremely rough and irregular terrain and is subject to unusually great abuse even under the more favorable circumstances of operation. In the World War, ambulances of the United States Army were provided with a rear step arranged in a fixed position somewhat below the lower floor surface of the ambulance body, but this was found to be generally unsatisfactory for the reason that the step projected downwardly rather close to the ground and when the vehicles were operated in the field and over extremely rough and irregular terrain the lower extremities of the step often struck the ground and were broken or damaged or, which was often more serious, the step became embedded in the ground so firmly that the vehicle was incapable of sufficient traction to move itself. Such a condition was obviously worse than the damaging of the step, since the ambulances often operated under hostile bombardment and the loss of traction might well mean the destruction of the vehicle and crew.

It is, therefore, a principal object of the present invention to provide a new and novel ambulance step having none of the disadvantages hereinbefore pointed out.

A further object of the invention is to provide a folding ambulance step, arranged to be shifted between an operative position closely adjacent the ground and an inoperative position entirely above the floor portion of the vehicle.

A further object of the invention is to provide an ambulance step provided with a latch mechanism to maintain the ambulance step in a raised inoperative position, to provide ample road clearance for the vehicle.

A further object of the invention is to provide a gravity-operated ambulance step so arranged and constructed that when the ambulance doors are opened from the inside the step will automatically fall from its normal inoperative position to an operative position wherein it will be ready to support the individuals dismounting from the rear doors of the ambulance.

A further object of the invention is to provide a novel folding ambulance step including a plurality of step retaining latches so arranged that the latches provided to secure the step in its inoperative or closed position will also act to supplement and reinforce the action of the conventional rear door latches, to provide a positive double locked arrangement for the rear doors of the vehicle in order to forestall any possibility of accidental opening of these doors.

In accomplishing the above objects, a conventional type of ambulance body having a pair of outwardly swinging rear doors has been provided with a shiftable ambulance step, supported from the stationary portions of the vehicle by a pair of downwardly extending step supports. The arrangement is such that the step is pivotally mounted with respect to the step supports and may be folded upwardly into a vertical position and then the entire structure including the step and supports may be again pivoted upwardly to bring the step in flat face-to-face relationship with the outer surfaces of the rear ambulance doors.

Two hooks are provided on the step and are arranged to be engaged with latches attached to the doors, the arrangement being such that one latch on each door engages one of the pair of hooks so that the step itself constitutes a locking bar extending across the doorway and preventing either door from being opened as long as either one of the step latches is engaged.

With reference now more particularly to the drawing, wherein:

Fig. 1 is a side elevational view, partly in section, of the rear portion of an army ambulance, constructed in accordance with the teachings of this invention;

Fig. 2 is a rear elevational view, partly in section, of the ambulance illustrated in Fig. 1;

Fig. 3 is a fragmental detail perspective view of the lower end of one of the step supporting bars.

The standard type of ambulance used by the United States Army includes a closed body 10 having the side walls 11, top 12, floor 13 and rear doors 14 and 15, each of which is mounted on suitable hinges 17. The entire body is, of course, mounted on a suitable chassis (not shown) which, however, includes the rear wheels 18. In conventional vehicle structures, the rear portion of the body 10 overhangs the rear wheel 18 a considerable distance, with the result that the angle of clearance indicated in the drawing by the angle A will become correspondingly less whenever any downwardly extending structure, such as a conventional step portion, is provided on the rear extremity of the vehicle body.

To provide sufficient clearance for satisfactory operation over broken ground and similar rough terrain, military specifications require that the angle A should not be less than approximately 30 degrees. In a structure of the dimensions illustrated, it will be seen that the natural overhang of the vehicle body is sufficient to establish the approximate 30 degree angle and it is, therefore, considered impractical to provide any type of step that will extend downwardly to any point substantially below the lower surface of the bumpers 19 while the vehicle is in operation. To be of any value, however, a step portion must extend substantially below this level to be of assistance when loading or unloading stretchers into the inside of the ambulance, since the bumpers 19 are not substantially below the surface of the floor 13 of the vehicle body.

The improved ambulance step forming the essence of the present invention includes an upper main step pivot 21 illustrated as a length of round metal rod extending between the mounting brackets 22 and 23 secured to the rear edge of the ambulance floor 13. The main step pivot 21 supports a pair of downwardly extending support bars 24 and 25, each of which are rolled to form an upper loop 26 encircling the rod 21 to establish a pivotal connection with the rod. The lower extremities of the bars 24 and 25 are formed with similar loops 27 to support and form a pivotal connection with a lower step pivot 28 which may, if desired, be of sufficient length to extend the entire distance between the bars 24 and 25. The lower loops 27 are provided, however, with a cutaway portion to form an abutment or limiting stop 29 arranged to cooperate with a portion 31 of each of the step brackets 32, and thus limit the clockwise pivotal movement of the step brackets 32 to the position shown in the drawing, so that the upper surface of the step plate 33 is in horizontal position. The pivotal movement of the step supporting bars 24 and 25 is similarly limited by a pair of lugs 34 formed on or secured to the bumper bars 19 and arranged to engage the rear surfaces of the support bars 24 and 25.

From the foregoing construction, it will be seen that when it is desired to lift the step structure into its inoperative position to permit full clearance within the angle A, the step 33 may be pivoted upwardly through 90 degrees of movement around the pivot 28 until it lies in flat face-to-face relationship with the bars 24 and 25 and then the entire assembly may be pivoted upwardly through 180 degrees of movement around the main pivot 21 until the step 33 lies in face-to-face relationship with the outer surfaces of the rear doors 14 and 15 of the vehicle, as illustrated in the dotted lines in Fig. 1. As the step structure approaches this upper or inoperative closed position, the latch hooks 36, provided on each of the step supporting brackets 32, will each enter an opening 37 in the outer metal surface of one of the doors 14 or 15. A pair of step latches 41 and 42 are provided on the doors 14 and 15, respectively, and each of these latches includes an inside operating handle 43 and an exterior operating handle 44. The arrangement is such that as the step assembly reaches its uppermost position each of the latch hooks 36 will penetrate the opening 37 and be engaged by the latch bolts 45 and 46, respectively, of the step latches 41 and 42. The bolts 45 and 46 are both spring-urged downwardly so that they will automatically engage the latch hooks 36 whenever the step assembly is manually lifted to its inoperative position. When so engaged, it will be obvious that the step portion 33 will extend across both of the rear doors 14 and 15 of the vehicle and will thus act as a locking bar across the doors and prevent either door from being opened as long as either of the latch bolts 45 or 46 are in engagement with the corresponding hook 36. Thus, the entire step structure serves as additional and auxiliary locking means for the rear doors of the ambulance so that the accidental opening of the doors will be impossible, even in the event that the normal vehicle latch 47 should be accidentally disengaged, either by the vibration of the vehicle or by other causes as, for example, by the action of a hysterical patient within the ambulance. In this connection, it may be pointed out that in military operations it is sometimes impossible to provide adequate attention to an injured patient while the vehicle is still in the field of combat, but that the latch arrangement herein disclosed is highly effective in preventing accidental opening of the doors of the vehicle by a mentally deranged patient by reason of the fact that the latches 41 and 42 must be simultaneously operated in order for either one to release. Thus, if either is operated first without the simultaneous operation of the other, the first will reengage before the second is released. Unless both are simultaneously released, the step 33 will remain in its transverse position across the back of the vehicle doors and will serve as a locking bar to prevent either door from being opened, irrespective of the position of the conventional door locking mechanism 47.

To lower the vehicle step from the inside, it is, however, only necessary to actuate both of the interior latch handles 43 simultaneously. Such action will release the step and allow it to swing downwardly by gravity or in response to the outward movements of the doors 14 and 15 As it swings downwardly, the step portion 33 and brackets 32 will also pivot outwardly with respect to the bars 24 and 25 so that the entire step assembly will automatically assume its operative position. It will be further noted that even in the event that the vehicle is operated with the step assembly lowered, damage to the step is quite unlikely, since whenever the vehicle is traveling in a forward direction and should pass over any obstacle that would extend above the angle designated as A and strike the step assembly, the entire step would be free to swing upwardly around the pivot 21 and thus ride over the obstacle without damage, after which it would return by gravity to its lowered or operating position.

The exact structural details of the invention have been described in their present preferred form as developed by Army engineers and adopted by the United States Army. It will be obvious, however, that numerous departures of structure may be made without departing from the essential teachings of the present disclosure. It is, therefore, requested that the scope of the present invention be limited only by the scope of the appended claims.

Having thus described my invention, what is claimed as new and desired to secure by Letters Patent, is:

1. A shiftable vehicle step including a mounting pivot below the floor of the vehicle body, adjacent the rear edge of the vehicle, and comprising a single metal rod extending in a generally horizontal direction between a pair of brackets secured to the vehicle; a pair of step supports spaced apart from each other and mounted on said mounting pivot, each of said supports comprising a relatively flat metal bar having an upper loop arranged to telescope over the aforementioned mounting pivot to establish a pivotal supporting connection for the bars; lugs arranged to cooperate with said support bars and the stationary portions of the vehicle body to limit the pivoted movement of the bars and thus support weights resting on the step to be hereinafter described, pivot supporting loops at the lower end of each of the step supporting bars, a step pivot supported within said loops, and a pair of step brackets carried by said step pivot; limit lugs cooperating between said step brackets and supports to limit the pivotal movement of the brackets, and a step plate supported by said brackets.

2. A shiftable vehicle step including a mounting pivot below the floor of the vehicle body and adjacent the rear edge of the vehicle, a step support mounted on said mounting pivot, lugs arranged to cooperate with said support and the stationary portions of the vehicle body to limit the pivoted movement of the support and thus support weights resting on the step to be hereinafter described, a step pivot at the opposite end of said supports, a step bracket carried by said step pivot; limit lugs cooperating between said step bracket and support to limit the pivotal movement of the brackets, a step plate supported by said brackets, a hook portion on said step support bracket, said hook being arranged to project inwardly through the outer panel of the vehicle door, and a manually releasable latch associated with said door whereby said hook may be secured to said latch to maintain the vehicle step in raised position and in flat face-to-face relationship with the outer surface of the vehicle door, the arrangement being such that the step latch and step tend to secure the vehicle door in closed position.

3. A shiftable step for an ambulance having a pair of hinged doors including a mounting pivot below the floor of the ambulance body, adjacent the rear edge of the ambulance body, and comprising a single metal rod extending in a generally horizontal direction between a pair of brackets secured to the ambulance body; a pair of step supports, spaced apart from each other and mounted on said mounting pivot, each of said supports comprising a relatively flat metal bar having an upper loop arranged to telescope over the aforementioned mounting pivot to establish a pivotal supporting connection for the bars, lugs arranged to cooperate with said support bars and the stationary portions of the vehicle body to limit the pivoted movement of the bars and thus support weights resting on the step to be hereinafter described, pivot supporting loops at the lower end of each of the step supporting bars, a step pivot supported within said loops, a pair of step brackets carried by said step pivot; limit lugs cooperating between said step brackets and supports to limit the pivotal movement of the brackets, a step plate supported by said brackets, a hook portion associated with each of the step support brackets, said hooks being arranged to project inwardly toward the vehicle doors, and a pair of manually releasable latches, one associated with each of said doors, whereby each of said hooks my be secured to said latch to maintain the ambulance step in raised position and in flat face-to-face relationship with the outer surface of the ambulance doors, the arrangement being such that the step latches and step tend to secure the ambulance doors in closed position.

4. In combination, a vehicle body including a floor, side walls, and a pair of doors mounted on hinges on each of the side walls and arranged to cooperate to close the doorway of the vehicle, a vehicle step plate, mounting means for said vehicle step plate including a pair of pivotal connections and an intermediate supporting member whereby said step plate may be shifted between a lowered position in horizontal arrangement below the vehicle doorway and a raised position in transverse vertical position across said vehicle doorway and in the path of the vehicle doors, and a pair of separate latch mechanisms, one latch mechanism being associated with each of said vehicle doors and independently engageable or disengageable with the vehicle step, so that the engagement of either of said latches will maintain the step in raised position and prevent the opening of either of said doors.

5. In combination, a vehicle body including a floor, side walls, and a pair of doors mounted on hinges on each of the side walls and arranged to cooperate to close the doorway of the vehicle, a vehicle step plate, mounting means for said vehicle step plate including pivotal connections and a supporting member whereby said step plate may be shifted between a lowered position below the stationary portions of the vehicle body and in horizontal arrangement below the vehicle doorway and a raised position wholly above the lowermost stationary portions of the vehicle body, and a pair of separate latch mechanisms, one latch mechanism being associated with each of said vehicle doors and independently engageable or disengageable with the vehicle step, so that the engagement of either of said latches will maintain the step in raised position and prevent the opening of either of said doors.

6. In combination, a vehicle body including a floor, side walls, and a door arranged to close the doorway of the vehicle, a vehicle step plate, mounting means for said vehicle step plate including pivotal connections and a supporting member whereby said step plate may be shifted between a lowered position in horizontal arrangement below the vehicle doorway and a raised position in transverse vertical position across said vehicle doorway and in the path of the vehicle door, a latch mechanism associated with the vehicle step structure, to maintain the step in raised position and prevent the opening of said door, a latch operating handle on the inner side of said door adapted to manually release the latch from the inside of the vehicle, and a latch operating handle on the outside of said door adapted to manually release the latch from the outside of the vehicle.

7. In a motor vehicle, including a body, floor, side walls and door hinged on one of the side walls and arranged to close the doorway of the vehicle, a vehicle step including a step plate and means for supporting said step plate in a horizontal position below the doorway of the vehicle, said means including a vertical supporting member and upper and lower pivots whereby the vertical supporting member is secured to the vehicle body and to the step respectively, said supporting member being arranged to permit the vehicle step to be shifted upwardly to assume a transverse position across the outer surfaces of the door; a manually operated latch for the vehicle door, and a separate, independent, releasable spring latch mechanism to maintain the aforesaid step in position across the door, whereby the spring latch of the step must be released to permit opening said door.

8. In a motor vehicle, including a body, floor, side walls, and pair of doors hinged on the side walls and arranged to close the doorway of the vehicle, a vehicle step including a step plate, means for supporting said step plate in a horizontal position below the doorway of the vehicle, said supporting means being arranged to permit the vehicle step to be shifted upwardly to assume a transverse position across the outer surfaces of the doors, and a pair of separate, independent, spring latches to maintain the step in said raised position, whereby the transverse step plate will act as a locking bar to maintain the door in closed position and can be released only by a simultaneous operation of both of said spring latches.

9. In a vehicle step, a step plate, a pair of vertical supporting members for said plate, an upper and lower pivot for said supporting members to establish pivotal connection with a vehicle body and with the step plate respectively, limiting stops arranged to permit 90 degrees of pivotal movement between the step plate and supports whereby a step plate may be moved into face-to-face relationship with the supports, limiting stops arranged to permit 180 degrees of pivotal movement of the supporting members around the upper pivots whereby the step and supporting member may be moved into face-to-face relationship with the rear doors of a vehicle, and a pair of separate independent spring latch mechanisms one of said spring latch mechanisms being associated with each of the doors to maintain the step structure in raised position.

WILLIAM B. JOHNSON.